(No Model.)
J. R. WEAVER.
CLAMP.
No. 554,808. Patented Feb. 18, 1896.
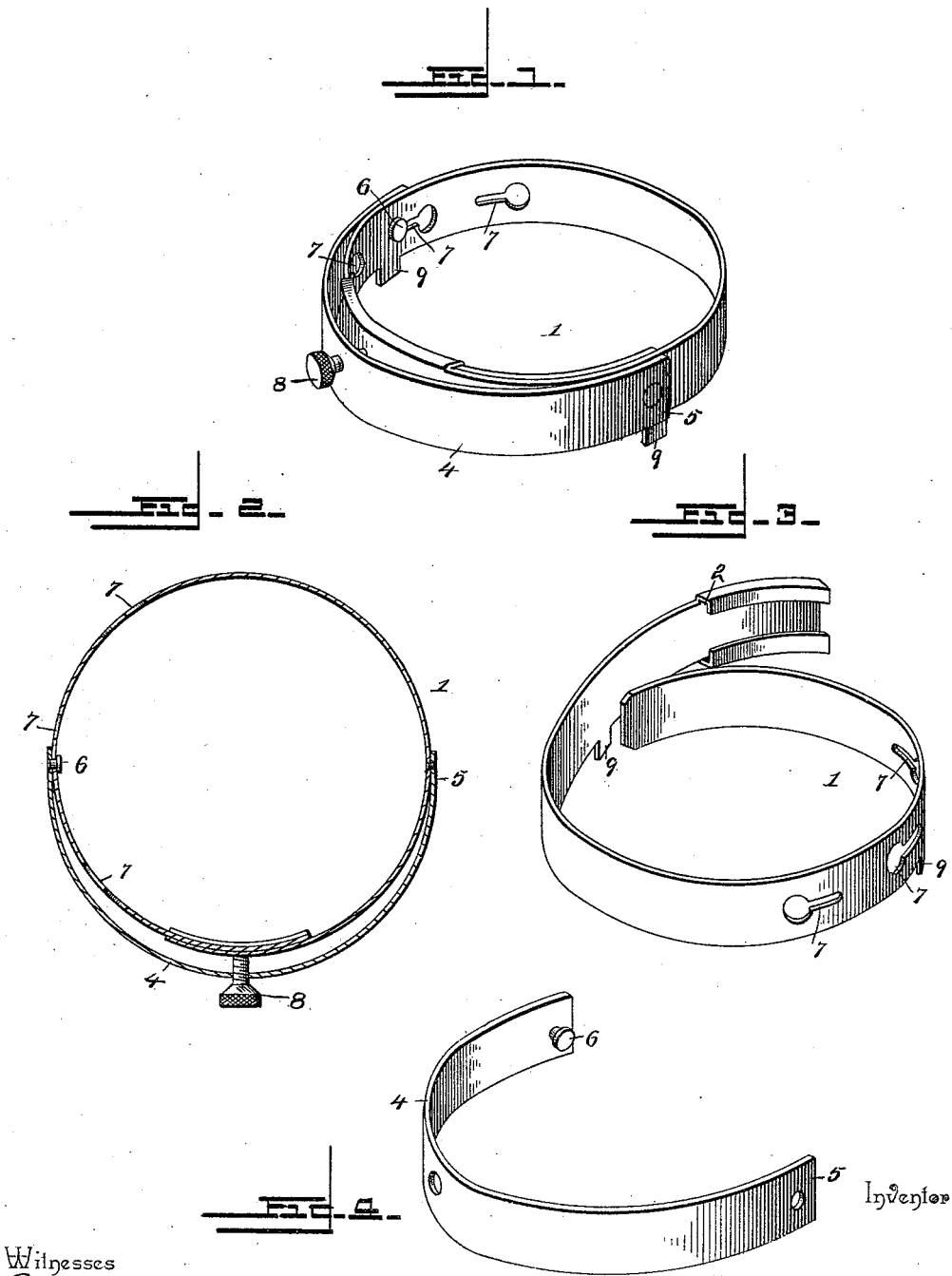
Witnesses
J. W. Riley
J. F. Riley
By his Attorneys,
C. A. Snow & Co.
Inventor
John R. Weaver.

UNITED STATES PATENT OFFICE.

JOHN ROBERT WEAVER, OF GUNTERSVILLE, ALABAMA, ASSIGNOR OF ONE-HALF TO EMMETT GILBREATH, OF SAME PLACE.

CLAMP.

SPECIFICATION forming part of Letters Patent No. 554,808, dated February 18, 1896.

Application filed August 10, 1895. Serial No. 558,935. (No model.)

*To all whom it may concern:*

Be it known that I, JOHN ROBERT WEAVER, a citizen of the United States, residing at Guntersville, in the county of Marshall and State of Alabama, have invented a new and useful Clamp, of which the following is a specification.

The invention relates to improvements in adjustable clamps.

The object of the present invention is to provide a simple and inexpensive clamp adapted for fastening lamp-globes to burners, stove-pipe-sections together, and the like, capable of ready adjustment to adapt itself to the size of the body to be clamped.

The invention consists in the construction and novel combination and arrangement of parts hereinafter fully described, illustrated in the accompanying drawings, and pointed out in the claims hereto appended.

In the drawings, Figure 1 is a perspective view of a clamp constructed in accordance with this invention. Fig. 2 is a longitudinal sectional view. Fig. 3 is a detail perspective view of the band. Fig. 4 is a similar view of the connecting-strap.

1 designates a band constructed of suitable metal and having its ends arranged to slide on each other to vary the diameter of the band to enable different sizes of objects to be clamped. One end of the band is provided at its side edges with opposite flanges, which are bent inward to form grooves or ways 2, and the other end portion, 3, of the band fits in the grooves or ways, whereby the two ends are slidingly connected. At one side of the band is permanently secured one end of a strap 4, which overlaps the ends of the band and which extends around the same to a point substantially diametrically opposite its other end, 5, and is detachably and adjustably connected with the band. The end 5 of the strap is secured to the band by a rivet or other suitable fastening device, and the other end of the strap is provided at its inner face with a headed projection 6 adapted to engage any one of a series of keyhole-slots 7, whereby the strap is adjustably and detachably connected with the band. The headed projection 6 is adapted to be inserted in the slot at the enlarged portion thereof and to be drawn into the contracted portion, which is of less width than the head of the projection. When the clamp is in engagement with the object to be held, the band is drawn tightly against the same and the strap is held against movement by an adjusting-screw 8, and it is impossible for the headed projection to become accidentally disengaged from its keyhole-slot.

The adjusting-screw 8 is mounted in a threaded perforation at the center of the strap and engages one of the ends of the band adjacent to the grooves or ways 2, and by moving the screw inward the ends of the band are caused to slide on each other, whereby the diameter of the band is decreased to contract the band and cause the same to clamp an object with the desired force.

The clamp may be round, rectangular, or any other desired form to accommodate itself to the object to be clamped, and when employed for securing globes to burners it is provided on the band at diametrically-opposite points with lugs 9, which enable the clamp to be mounted on a burner.

It will be seen that the clamp is exceedingly simple and inexpensive in construction; that it is capable of ready adjustment to vary its size to suit the object to be clamped, and that it is readily forced into contact with the same with the desired pressure.

Changes in the form, proportion, and the minor details of construction may be resorted to without departing from the principle or sacrificing any of the advantages of this invention.

What I claim is—

1. A clamp comprising a band having its ends slidingly connected, a strap connected with the band beyond the ends thereof, and an adjusting-screw engaging the band at the overlapping portions thereof and mounted on the strap, and adapted to contract the diameter of the band, substantially as described.

2. A clamp comprising a band having its ends overlapping and arranged to slide on each other, a strap having one end permanently secured to one side of the band and having its other end adjustably and detachably secured to the opposite side of the band, and an adjusting-screw mounted on the strap and engaging the overlapped portions of the band, substantially as described.

3. A clamp comprising a band provided at one end with opposite grooves or ways and having its other end fitting in the grooves or ways and arranged to slide longitudinally thereof, said band being provided at one side with a series of keyhole-slots, a strap secured to the opposite side of the band and provided adjacent to the slots with a headed projection adapted to interlock with any one of them, and an adjusting-screw mounted on the strap and engaging the band at the overlapped portion thereof, substantially as described.

In testimony that I claim the foregoing as my own I have hereto affixed my signature in the presence of two witnesses.

JOHN ROBERT WEAVER.

Witnesses:
W. H. CARTER,
W. H. COWEN.